US007890662B2

(12) United States Patent
Albert et al.

(10) Patent No.: US 7,890,662 B2
(45) Date of Patent: Feb. 15, 2011

(54) SYSTEM AND METHOD FOR PROVIDING UNIFIED IP PRESENCE

(75) Inventors: Mark Albert, Cary, NC (US); Chris O'Rourke, Apex, NC (US); Richard L. Gray, Cary, NC (US); Robert A. Mackie, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 299 days.

(21) Appl. No.: 11/838,460

(22) Filed: Aug. 14, 2007

(65) Prior Publication Data

US 2009/0049201 A1 Feb. 19, 2009

(51) Int. Cl.
*G06F 15/16* (2006.01)
*G06F 15/173* (2006.01)

(52) U.S. Cl. ...................................... 709/248; 709/238
(58) Field of Classification Search .................. 709/248
See application file for complete search history.

(56) References Cited

U.S. PATENT DOCUMENTS

| 5,920,705 | A | 7/1999 | Lyon et al. ............... 395/200.7 |
|---|---|---|---|
| 6,049,893 | A | 4/2000 | Liddell et al. .................. 714/23 |
| 6,169,794 | B1 * | 1/2001 | Oshimi et al. .......... 379/221.09 |
| 6,170,068 | B1 | 1/2001 | Liddell et al. .................. 714/49 |
| 7,539,760 | B1 * | 5/2009 | Petry et al. .................. 709/227 |
| 2002/0107966 | A1 * | 8/2002 | Baudot et al. ............... 709/227 |
| 2003/0187991 | A1 * | 10/2003 | Lin et al. .................... 709/227 |
| 2003/0218982 | A1 * | 11/2003 | Folkes et al. ................ 370/238 |
| 2004/0260800 | A1 | 12/2004 | Gu et al. .................... 709/223 |
| 2005/0120139 | A1 * | 6/2005 | Kochhar et al. ............. 709/248 |
| 2006/0002343 | A1 * | 1/2006 | Nain et al. .................. 370/331 |
| 2006/0031374 | A1 * | 2/2006 | Lu et al. ..................... 709/207 |
| 2006/0072480 | A1 | 4/2006 | Deval et al. ................. 370/254 |
| 2006/0198296 | A1 * | 9/2006 | Majee et al. ................. 370/216 |
| 2006/0262716 | A1 * | 11/2006 | Ramaiah et al. ............. 370/216 |
| 2006/0291434 | A1 | 12/2006 | Gu et al. ..................... 370/338 |
| 2007/0005801 | A1 * | 1/2007 | Kumar et al. ............... 709/238 |
| 2007/0083669 | A1 * | 4/2007 | Tsirtsis et al. ............... 709/238 |
| 2007/0086360 | A1 * | 4/2007 | Berg .......................... 370/254 |
| 2007/0121579 | A1 * | 5/2007 | Matthews et al. ........... 370/351 |

(Continued)

OTHER PUBLICATIONS

W. Richard Stevens TCP/P Illustrated, vol. I: The Protocols (1993).*

(Continued)

*Primary Examiner*—Saleh Najjar
*Assistant Examiner*—Robert Shaw
(74) *Attorney, Agent, or Firm*—Baker Botts L.L.P.

(57) ABSTRACT

In accordance with one embodiment, a method includes creating a first session object by a first traffic processor of a first network element operating in an active mode, the first session object being associated with a communication session between an end user terminal and an information provider. The method further includes sending a state synchronization message associated with the first session object from the first traffic processor. The state synchronization message includes a transport layer address associated with a second traffic processor of a second network element operating in a standby mode. The state synchronization message is adapted to be received by the second traffic processor and cause the second traffic processor to create a second session object, the second session object tracking the communication session between the end user terminal and the information provider.

24 Claims, 2 Drawing Sheets

U.S. PATENT DOCUMENTS

2007/0156919 A1* 7/2007 Potti et al. ................. 709/238
2007/0274307 A1* 11/2007 Karino et al. ............... 370/389
2008/0016386 A1* 1/2008 Dror et al. .................... 714/4
2009/0063893 A1* 3/2009 Bagepalli et al. ............... 714/4

OTHER PUBLICATIONS

Check Point Software Technologies Ltd., Advanced Technical Reference Guide VPN-1/FireWall- © , V4.1 (Jun. 2000).*

* cited by examiner

SYSTEM AND METHOD FOR PROVIDING UNIFIED IP PRESENCE

TECHNICAL FIELD

An embodiment relates in general to communications and, more particularly to, a system and a method for providing unified IP presence.

BACKGROUND

Processor systems have grown in complexity and sophistication in recent years. One challenge exists in multi-processor systems that present a single IP address to adjacent networks/subnets. For example, while operating in certain redundancy schemes with state synchronizations between active and standby, the delivery of state synchronization messages can create a performance bottleneck within the system. This bottleneck may be created when the active and standby system state messages are handled by a single processor on the system sending and receiving the state sync messages. This "funneling" of messages through a single processor can occur because some state sync messages may be addressed to the single IP/MAC address of the destination system, and this traffic is handled by a single processor within the system. Other challenges in processor systems relate to speed, latency, minimization of circuit-board space, and optimization of limited resources. Thus, designing an optimal processing architecture that addresses some of these issues offers a significant challenge for participants in this sector.

OVERVIEW

In accordance with one embodiment, a method includes creating a first session object by a first traffic processor of a first network element operating in an active mode, the first session object being associated with a communication session between an end user terminal and an information provider. The method further includes sending a state synchronization message associated with the first session object from the first traffic processor. The state synchronization message includes a transport layer address associated with a second traffic processor of a second network element operating in a standby mode. The state synchronization message is adapted to be received by the second traffic processor and cause the second traffic processor to create a second session object, the second session object tracking the communication session between the end user terminal and the information provider. In various embodiments, this provides redundancy and continuity of service to the end user and session in the event that the primary traffic processor fails.

In accordance with another embodiment, a method includes receiving a state synchronization message by a first traffic processor of a first network element operating in a standby mode. The state synchronization message includes a transport layer address associated with the first traffic processor, the state synchronization message being received in response to a second traffic processor of a second network element, operating in an active mode, creating a first session object associated with a communication session between an end user terminal and an information provider. The method further includes creating a second session object by the first traffic processor in response to receiving the state synchronization message, the second session object tracking the communication session between the end user terminal and the information provider.

Technical advantages of certain embodiments include a reduction in CPU cycles for one or more processors in a communication system. Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DESCRIPTION OF EXAMPLE EMBODIMENTS

Figure 1:
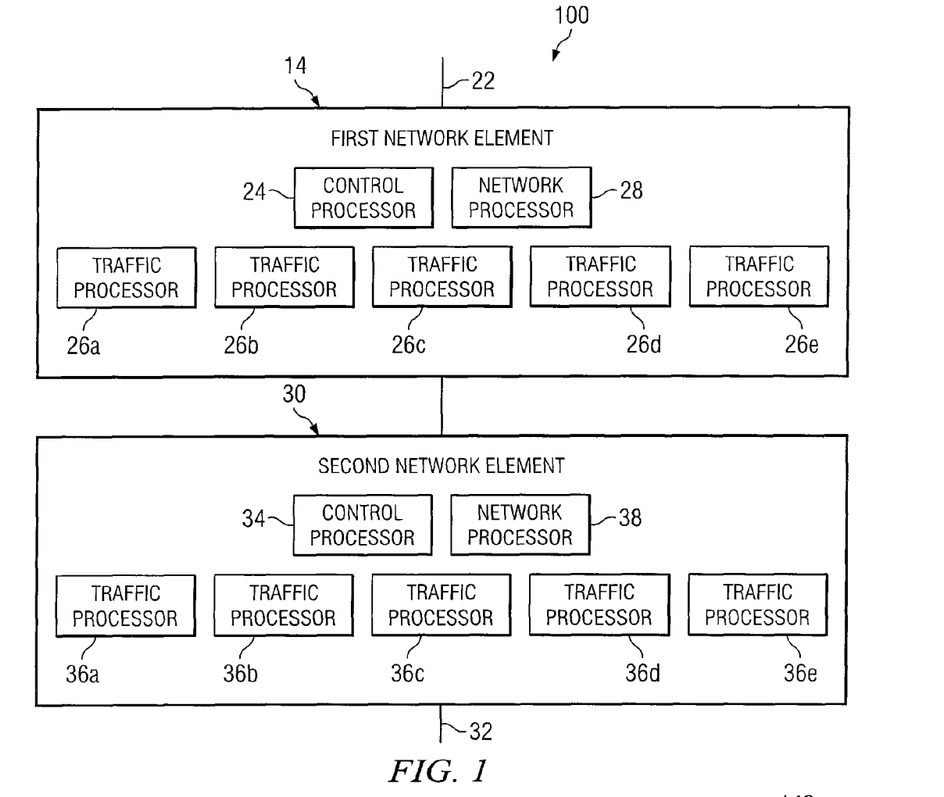
FIG. 1 is a general, simplified block diagram of a system for providing unified IP presence for a 1:1 stateful redundancy in accordance with one embodiment of the present invention.

FIG. 1 is a simplified block diagram of a system 100 for providing unified IP presence for a 1:1 stateful redundancy system in accordance with one example embodiment. System 100 includes a first network element 14 and a second network element 30. The first network element 14 includes a first network interface 22 that provides an interface between the first network element 14 and one or more communication networks to which the network element 14 is connected. Similarly, the second network element 30 includes a second network interface 32 that provides an interface between the second network element 30 and one or more communication networks to which the network element is connected. In at least one embodiment, the first network element 14 and the second network element 30 can reside on the same local area network (LAN) segment.

The first network element 14 may further include a control processor 24 and an array of traffic processors 26a-26e. The control processor 24 can maintain the presence of the first network element 14 from a network layer (Layer 3) perspective such that single IP address is associated with the network element 14. The control processor 24 can answer Address Resolution Protocol (ARP) requests, issue ARP requests, handle broadcasts, and handle data layer (Layer 2) and network layer (Layer 3) activity, as well as various other functions, from a representing IP address perspective. The traffic processors 26a-26e can handle network traffic that is transmitted through the first network element 14. The traffic through the traffic processors 26a-26e is distributed among the traffic processors 26a-26e by a network processor 28, such as an Internet Exchange Processor (IXP). In at least one embodiment, the network processor 28 performs a hash-based load-balancing to distribute traffic among the traffic processors 26a-26e. Other embodiments do not include such operations.

In one example scenario, the second network element 30 further includes a control processor 34 and an array of traffic processors 36a-36e. The control processor 34 maintains the presence of the second network element 30 from a network layer (Layer 3) perspective such that single IP address is associated with the second network element 30. The control processor 34 will, for example, answer ARP requests, issue ARP requests, deal with broadcasts, and handle data layer (Layer 2) and network layer (Layer 3) activity from a representing IP address perspective. The traffic processors 36a-36e handle network traffic that is transited through the second network element 30. The traffic through the traffic processors 36a-36e is distributed among the traffic processors 36a-36e by a network processor 38, such as an Internet Exchange Processor (IXP). In at least one embodiment, the network processor 38 can perform a hash-based load-balancing to distribute traffic among the traffic processors 36a-36e.

In accordance with the teachings of at least one embodiment, the proposed approach solves the problem of funneling state sync messages through a single processor in a multi-processor system by utilizing layer 4 (L4) ports to enable direct communication between processors, while maintaining a single IP address and MAC address on each of the systems (active and standby).

A challenge exists in multi-processor systems, which present a single IP address to adjacent networks/subnets. While operating in a 1:1 redundancy scheme with state synchronization between active and standby, the delivery of state synchronization messages can create a performance bottleneck within the system. This bottleneck is created when the active and standby system state messages are handled by a single processor on the system sending and receiving the state sync messages. This "funneling" of high availability (HA) messages through a single processor occurs because state sync messages are addressed to the single IP/MAC address of the destination multi-processor system, and this traffic is handled by a single processor within the system to provided unified IP presence.

To address this problem, the implementation maintains direct processor to processor communication without funneling traffic through a single processor in the system. In certain embodiments, this is accomplished through the combination of several key design elements.

A first key design element of certain embodiments is the symmetric distribution of state on standby and active systems, which allows state synchronization messages to flow between processors. For example, a subscriber 1.1.1.1's context is maintained on a processor 1 on both systems, allowing state messages to flow directly between the processor 1 on active to the processor 1 on the standby.

A second key design element of certain embodiments is Layer 4 differentiation in state synchronization messages, which allows hardware elements between the active and standby system to differentiate and route traffic to the correct processor on the system receiving the state sync message without the introduction of IP addressing for each of the processors. In at least one embodiment, all state sync messages are sent to a single IP address on the peer system, but 6 destination UDP ports are used (one for each of the 6 processors), which allows the IXP processor on ingress to map these packets to the appropriate processor on receiving the state sync message.

A third key design element of certain embodiments is an on board Layer 4 (L4) filtering and re-routing engine. In at least one embodiment, an IXP processor supports L4 filtering to differentiate incoming messages on destination protocol and port, and map them to specific processors within the multi-processor system.

Advantages provided by certain embodiments include performance improvements by removing funneling from the path, and reduced addressing requirements of the system, which reduces the operational resources consumed such as Virtual LANS (VLANS), MAC addresses, IP addresses, etc.

In at least one embodiment, system 100 operates as a 1:1 stateful redundancy system in which state information is exchanged between the first network element 14 and the second network element 30 using state synchronization messages. Other embodiments involve different redundancy schemes. In the stateful redundancy system, one of the first network element 14 and the second network element 30 operates in an active mode, while the other operates in a standby mode. The network element operating in the active mode handles all network traffic transiting through the network element and relays state information from the control processor and array of traffic processors in the active network element to the control processor and array of traffic processors in the network element operating in the standby mode. Accordingly, state information in the active network element is backed up in the standby network element. Upon determining that there has been a failure of the active network element, the standby network element transitions to the active mode and takes over the operation of the functions of the failed network element in the same state at which the failure occurred. The control processor 24 of the first network element 14 and the control processor 34 of the second network element 30 are responsible for making the determination regarding whether the first network element 14 and second network element 30 are in the active or standby mode.

In at least one embodiment, each of the first network element 14 and the second network element 30 represent themselves to the network at the network layer (Layer 3) with a single IP address. However, when the first network element 14 and the second network element 30 communicate with each other, they can do so using direct array member to array member state synchronization message flow over the transport layer (Layer 4), or other suitable communication protocols.

In at least one example embodiment in which the first network element 26a is operating in the active mode and the second network element 30 is operating in the standby mode, the traffic processor 26a of the first network element 14 sends state synchronization messages directly to the traffic processor 36a of the second network element 30. Accordingly, it is not necessary for the state synchronization messages exchanged by the traffic processors 26a-26e and the traffic processors 36a-26e to be funneled through the control processor 24 of the first network element 14 or the control processor 34 of the second network element, thus avoiding bottlenecking of the control processor in a network element.

In at least one embodiment, to provide for direct processor to processor message exchange, messages exchanged between processors are addressed at the transport layer (Layer 4). In at least one embodiment, a User Datagram Protocol (UDP) port number is associated with each processor, and messages intended for that processor are addressed to the UDP port number associated with that processor. In the embodiment illustrated in FIG. 1, each of the control processor 24 and five traffic processors 26a-26e of the first network element 14, and the control processor 34 and five traffic processors 36a-36e of the second network element 30 are assigned a different UDP port number. All of these UDP parameters and Layer 4 characteristics can be varied or substituted without departing from the described embodiments.

Consider one embodiment in which the first network element 14 is operating in the active mode and the second network element 30 is operating in the standby mode. When one of the control processor 24 or the traffic processors 26a-26e of the first network element 14 sends a message, such as a state synchronization message, to one of the control processor 34 or traffic processors 36a-36e of the second network element 30, the message is addressed to the assigned UDP destination port number of the destination processor. On receiving these messages, the network processor 38 of the second network element 30 routes the message based on the destination UDP port number, and delivers the message to the appropriate processor without requiring the message to funnel through the control processor 34 of the second network element 30. Although in the described embodiment, a destination UDP port number is used, it should be understood in other embodiments that any type of transport layer addressing may be used.

Accordingly, the first network element 14 and the second network element 30 are each represented to the network as having a single IP presence, while the internal processors of each of the first network element 14 and the second network element 30 communicates directly in a one-to one relationship over the network, thus maintaining six distinct communication channels between the two network elements. Transport layer (Layer 4) differentiation of state synchronization messages allows the standby network element to differentiate and route traffic to the correct traffic processor on the standby network element using transport layer addressing (Layer 4) without requiring network level addressing (IP addressing) for each of the traffic processors. In at least one embodiment, all state synchronization messages are sent from the active network element to a single IP address on the standby network element. However, six destination UDP ports are used, one for each of the traffic processors: allowing the network processor on the standby system to map these state synchronization messages on ingress to the appropriate traffic processor on the standby system.

In accordance with at least one embodiment, system 100 has a symmetric distribution of load between the first network element 14 and the second network element 30. In such an embodiment, the state information maintained on traffic processor 26a of first network element 14 is maintained on traffic processor 36a of the second network element 30. Similarly, the state information maintained on traffic processor 26b is also maintained on traffic processor 36b, the state information maintained on traffic processor 26c is also maintained on traffic processor 36c, the state information maintained on traffic processor 26d is also maintained on traffic processor 36d, and the state information maintained on traffic processor 26e is also maintained on traffic processor 36e. The control processor 24 of the first network element 14 and the control processor 34 of the second network element 30 are each responsible for backing up their own state and deciding if they are in active or standby mode, but do not get loaded up with the work related to maintaining redundancy that includes sending state synchronization messages to the associated traffic processors 26a-26e and 36a-36e. The control processor 24 and the control processor 34 are, thus, free to perform other functions.

In an example embodiment of FIG. 1 in which the first network element 14 is in the active mode and the second network element 30 is in the standby mode, the state context of a particular subscriber 1.1.1.1 participating in a communication session is maintained by the traffic processor 26a of the first network element 14. State synchronization messages are sent from the traffic processor 26a to the traffic processor 36a of the second network element 30 so that the state context of subscriber 1.1.1.1 is also maintained on the second network element 30, which is operating, in standby mode. If a failure of the first network element 14 is determined, the second network element 30 enters the active mode and the communication session can be resumed without interruption.

Although the first network element 14 and the second network element 30 are each described as having one control processor 24 and 34, one network processor 28 & 38, and five traffic processors 26a-26e & 36a-36e, it should be understood that the principles described herein could be applied to network elements having any number of the above-identified processors.

Software and/or hardware may reside in first network element 14 and/or second network element 30 in order to achieve the teachings of the features of the described embodiments. Note that, due to their flexibility, these components may alternatively be equipped with (or include) any suitable component, device, application specific integrated circuit (ASIC), processor, microprocessor, algorithm, read-only memory (ROM) element, random access memory (RAM) element, erasable programmable ROM (EPROM), electrically erasable programmable ROM (EEPROM), field-programmable gate array (FPGA), or any other suitable element or object that is operable to facilitate the operations thereof. Considerable flexibility is provided by the structure of first network element 14 and/or second network element 30 in the context of system 100 and, accordingly, they should be construed as such.

It should be noted that the internal structure of the system of FIG. 1 is versatile and can be readily changed, modified, rearranged, or reconfigured in order to achieve its intended operations or additional operations. Additionally, any of the items within FIG. 1 may be combined, where appropriate, or replaced with other functional elements that are operable to achieve any of the operations described herein.

A component of system 100 may include any suitable arrangement of elements, for example, an interface, logic, memory, other suitable element, or a combination of any of the preceding. An interface receives input, sends output, processes the input and/or output, performs other suitable operation, or performs a combination of any of the preceding. An interface may comprise hardware and/or software.

Logic performs the operations of the component, for example, executes instructions to generate output from input. Logic may include hardware, software, other logic, or a combination of any of the preceding. Certain logic, such as a processor, may manage the operation of a component. Examples of a processor include one or more computers, one or more microprocessors, one or more applications, other logic, or a combination of any of the preceding.

A memory stores information. A memory may comprise computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), other computer-readable medium, or a combination of any of the preceding.

Figure 2:
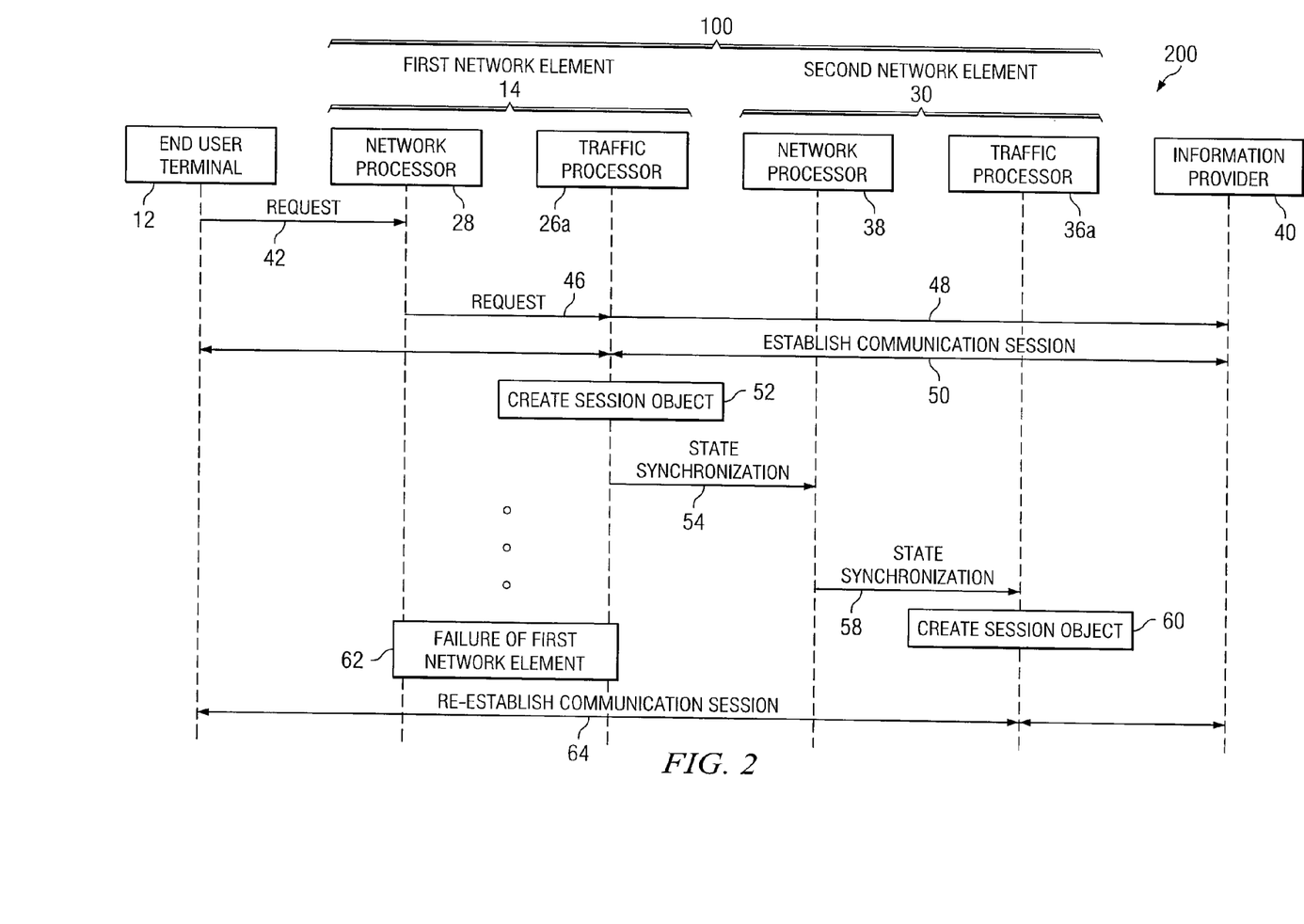
FIG. 2 is an example signaling diagram of a method for providing unified IP presence in accordance with one embodiment of the present invention.

FIG. 2 is an example signaling diagram of a procedure 200 for providing unified IP presence in accordance with one embodiment. In the embodiment illustrated in FIG. 2, system 100 of FIG. 1 provides 1:1 redundancy in which the first network element 14 is operating in the active mode, and the second network element 30 is operating in the standby mode.

In accordance with at least one embodiment, a subscriber associated with an end user terminal 12 wishes to establish a communication session with an information provider 40. In step 42, the end user terminal 12 sends a request to establish the communication session to the network processor 28 of the first network element 14.

The request is then sent from the network processor 28 to the traffic processor 26a of the first network element 14 in a step 46. In step 48, the request is sent from the traffic processor 26a to the information provider 40. In step 50, the communication session is established between the end user terminal 12 and the information provider 40. In accordance with at least one embodiment, traffic associated with the communication session established between the end user terminal 12 passes through the traffic processor 26a of the first network element 14. In still other embodiments, the traffic processor 26a may be used to relay traffic from the end user terminal 12 to the information provider 40, and a different traffic processor 26b-26e may be used to relay traffic from the information provider 40 to the end user terminal 12.

In step 52, a session object is created by the traffic processor 26a. The session object is used to track the communication session between the end user terminal 12 and the information provider 40 to obtain tracking information associated with the communication session. Examples of tracking information that can be tracked by the session object include billing information and data mining information associated with the communication session. In step 54, the traffic processor 26a sends a state synchronization message having a destination IP address associated with the second network element 30, and a UDP destination port associated with the traffic processor 36a of the second network element 30. The state synchronization message is received by the network processor 38 of the second network element 30. The state synchronization message includes information related to the state context of the information session including the tracking information obtained by the session object.

Upon receiving the state synchronization message, the network processor 38 forwards the state synchronization message to the traffic processor 36a associated with the UDP destination port in step 58. In step 60, the traffic processor creates a symmetric session object from the contents of the state synchronization message to track the communication session between the communication session between the end user terminal 12 and the information provider 40.

In the event of a failure of the first network element 14, the second network element 30 enters the active mode. In at least one embodiment, the first network element 14 experiences a failure of one or more of its components in step 62. In step 64, traffic between the end user terminal 12 and the information provider 40 is rerouted from passing through the first network element 14 to passing through the second network element resulting in reestablishment of the communication session. In the reestablished communication session, the traffic between the end user terminal 12 and the information provider 40 passes through the traffic processor 36a of the second network element 36a.

Since the traffic processor 36a has the symmetric session object open and already tracking the end user terminal 12 communication with the information provider 40 when the second network element 30 is in the standby mode, the second network element is able to provide continuity of service upon switching to the active mode.

Some of the steps discussed with reference to FIG. 2 may be changed or deleted where appropriate and additional steps may also be added to these process flows. These changes may be based on specific communication architectures or particular interfacing arrangements and configurations of associated elements and do not depart from the scope or the teachings of the described embodiments.

Figure 3:
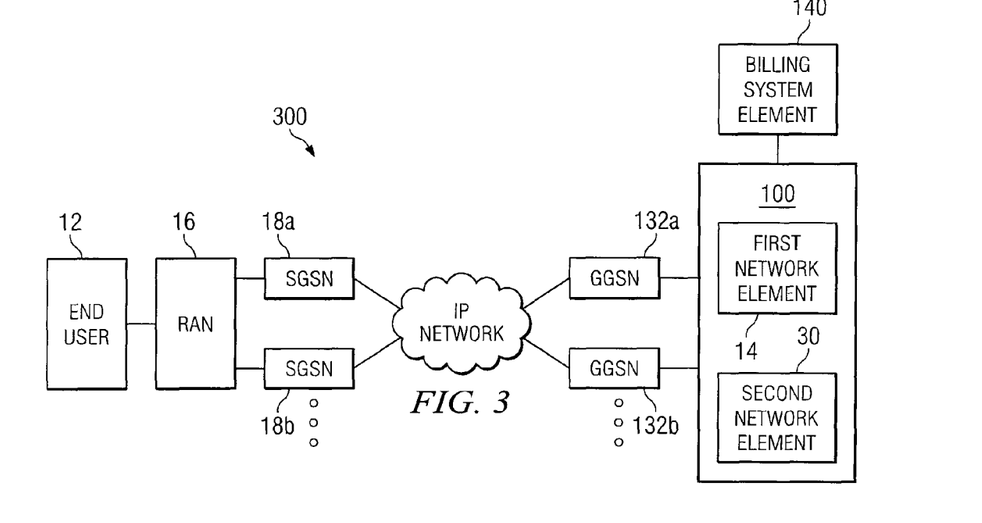
FIG. 3 is a simplified block diagram of one embodiment of a communication system that may include some aspects of the 1:1 stateful redundancy system of FIG. 1.

FIG. 3 is a simplified block diagram of an embodiment of a communication system 300 including the 1:1 stateful redundancy system 100 of FIG. 1. Communication system 300 includes end user 12, system 100, a billing system element 140, a radio access network (RAN) 16, multiple serving general packet radio service (GPRS) support nodes (SGSN) 18a and 18b, and an internet protocol (IP) network 20. Additionally, communication system 300 includes multiple gateway GPRS support nodes (GGSNs) 132a-b. In the embodiment illustrated in FIG. 3, system 100 operates as a client services gateway (CSG) having 1:1 stateful redundancy. System 100 operates to facilitate communications between system 100 and billing system element 100.

Communication system 300 may be generally configured or arranged to represent 2.5G communication architecture applicable to a Global System for Mobile (GSM) environment in accordance with a particular embodiment. Communication system 300 may also be configured to reflect a version of any suitable GPRS tunneling protocol. Communication system 300 may additionally cooperate with first generation, 2G, and 3G architectures that provide some configuration for allocating data to an end user in a network environment. Communication system 300 may also be employed in any other suitable communication architecture that seeks to allocate or otherwise manage data or information in a network environment. In another example, communications system 300 may cooperate with the Point-to-Point Protocol (PPP).

In accordance with an embodiment, communication system 300 operates to accurately manage user access. System 100 may parse IP packets transmitted between a user (client) and a server (or any other suitable destination). For selected flows and for selected clients, billing system element 140 debits a user account based on the type and quantity of information being transmitted. In a general sense, system 100 may cooperate with billing system element 140 in order to charge an end user of the end user 12 based on a particular event, content, or communication flow. System 100 may query one or more of the elements included within billing system element 140 in order to effectively and accurately distribute information to end user 12.

The user of the end user terminal 12 is a client, customer, entity, source, or object seeking to initiate network communication in communication system 300 via IP network 20. End user terminal 12 may be inclusive of devices used to initiate a communication, such as a computer, a personal digital assistant (PDA), a laptop or an electronic notebook, a telephone, a mobile station, or any other device, component, element, or object capable of initiating voice or data exchanges within communication system 300. End user terminal 12 may also be inclusive of a suitable interface to the human user, such as a microphone, a display, a keyboard, or other terminal equipment (such as for example an interface to a personal computer or to a facsimile machine in cases where end user 12 is used as a modem). End user terminal 12 may also be any device that seeks to initiate a communication on behalf of another entity or element, such as a program, a database, or any other component, device, element, or object capable of initiating a voice or a data exchange within communication system 300. Data, as used herein in this document, refers to any type of packet, numeric, voice, video, graphic, or script data, or any type of source or object code, or any other suitable information in any appropriate format that may be communicated from one point to another.

RAN 16 is a communications interface between end user terminal 12 and SGSNs 18a and 18b. RAN 16 may comprise a base transceiver station and a base station controller in one embodiment. The communications interface provided by RAN 16 may allow data to be exchanged between end user terminal 12 and any number of selected elements within communication system 300. RAN 16 may facilitate the delivery of a request packet generated by end user terminal 12 and the reception of information sought by end user terminal 12. RAN 16 is only one example of a communications interface between end user 12 and SGSNs 18a and 18b. Other suitable types of communications interfaces may be used for any appropriate network design and be based on specific communications architectures in accordance with particular needs.

SGSNs 18a and 18b and GGSNs 132a and 132b are communication nodes or elements that cooperate in order to facilitate a communication session involving end user terminal 12. GGSNs 132a-b are communications nodes operating in a GPRS environment that may be working in conjunction with multiple SGSNs 18a and 18b to provide a communications medium in a GPRS service network. GGSNs 132a and 132b may be inclusive of a walled garden (providing a security or an access functionality to communication system 300) or any other suitable mechanism that a network operator may choose to implement in providing some connectivity for a network. GPRS represents a packet-based data bearer service for communication services that may be delivered as a network overlay for any type of suitable network configuration or platform. GPRS may support multiple internet communication protocols and may enable existing IP, point to point protocol (PPP), or any other suitable applications or platforms to operate over a given network.

When end user terminal 12 changes between SGSN 18a and 18b, the change may be communicated to system 100 by any appropriate node such as a selected GGSN 132a or 132b. This could be effectuated by a remote access dial-in user service (RADIUS) accounting message via a start signal or an interim update signal. This could also be reflected in a vendor-specific attribute that indicates the new SGSN being different from the current SGSN being used by end user terminal 12. That message may also be communicated to billing system element 140 indicating the change in SGSN. The change in SGSN may result in quota data being returned to billing system element 140 for this particular data such as, for example, prepaid content. Pricing may vary for prepaid content depending on the geographic position of end user terminal 12, roaming off network, or which SGSN is currently being implemented. Additionally, for example, pricing may also be different based on a given fee structure such as pricing per download, pricing per byte, or pricing for a selected time interval. Alternatively, any other parameter may be used in order to vary billing rates provided for a given end user 12. A selected GGSN 132a or 132b may report the change in SGSN by end user terminal 12 via RADIUS messaging. Alternatively, this signaling may be provided by any data exchange or architected in any suitable communication standard or protocol in accordance with particular needs.

IP network 20 represents a series of points or nodes of interconnected communication paths for receiving and transmitting packets of information that propagate through communication system 300. IP network 20 offers a communicative interface between end user 12 and selected GGSNs 132a-b and may be any local area network (LAN), wireless local area network (WLAN), metropolitan area network (MAN), wide area network (WAN), virtual private network (VPN), or any other appropriate architecture or system that facilitates communications in a network environment. IP network 20 may implement a user datagram protocol (UDP)/internet protocol (UDP/IP) connection and use a transmission control protocol (TCP/IP) communication language protocol in particular embodiments. However, IP network 20 may alternatively implement any other suitable communication protocol for transmitting and receiving data packets within communication system 300.

System 100 may be inserted into a data flow that may view, extract, identify, access, or otherwise monitor information included within the data flow. System 100 may handle the enforcement of access, quota distribution, and accounting that is provided by the information retrieved from elements included within billing system element 140. System 100 may generally deduct quota after it has been properly allocated and, subsequently, retrieve additional quota when that quota allocation has been consumed. In a general sense, system 100 may be responsible for quota enforcement for end user terminal 12. System 100 may include any suitable software, hardware, components, modules, devices, elements, or objects to facilitate the operations thereof.

In at least one embodiment, the first network element 14 of system 100 is operating in the active mode, and the second network element 30 is operating in the standby mode. The first network element 14 and the second network element 30 are each represented to the rest of the communication system 300 by a single IP address.

In this embodiment, a traffic processor 26a of the first network element 14 handles the traffic transiting through the network element to and from the end user terminal 12, and sends state synchronization message addressed at the transport layer to the traffic processor 36a of the second network element 30. Accordingly, state information in the first network element 14 is backed up in the second network element 30. If there is a failure of the first network element 14, the second network element 30 enters the active mode and takes over the handling of traffic to and from the end user terminal 12 in the same state at which the failure occurred in the same or similar manner as the embodiments described with respect to FIGS. 1-2.

Although the present embodiments have been described in detail with reference to particular embodiments, system 100 may be extended to any scenario requiring message exchange among processors in a multi-processor system. This may also be extended to any other network signaling protocols to achieve the teachings of the described embodiments. Moreover, significant flexibility is provided by system 100 in that any suitable one or more components may be replaced with other components that facilitate their operations.

Additionally, although described in specific environments and contexts, the present embodiments could be used in countless applications. Numerous other changes, substitutions, variations, alterations, and modifications may be ascertained by those skilled in the art and it is intended that the present embodiments encompass all such changes, substitutions, variations, alterations, and modifications as falling within the spirit and scope of the appended claims. Moreover, the present embodiments are not intended to be limited in any way by any statement in the specification that is not otherwise reflected in the appended claims.

Although the present embodiments have been described with several embodiments, a myriad of changes, variations, alterations, transformations, and modifications may be suggested to one skilled in the art, and it is intended that the present embodiments encompass such changes, variations, alterations, transformations, and modifications as fall within the scope of the appended claims.

What is claimed is:

1. A method comprising:
    creating a first session object by a first traffic processor of a first plurality of processors of a first network element operating in an active mode, the first session object associated with a communication session between an end user terminal and an information provider, wherein the first network element and a second network element present a single network layer address to the end user terminal and the information provider;

the first plurality of processors residing on a first board of the first network element;

a portion of traffic associated with the communication session between the end user terminal and the information provider being routed through the first traffic processor of the first network element;

determining, at the first network element, a specific traffic processor of a second plurality of processors to which to send a state synchronization message associated with the first session object, the second plurality of processors residing on a second board of the second network element operating in a standby mode;

associating a transport layer address corresponding to the specific traffic processor of the second network element with the state synchronization message;

sending the state synchronization message to a first processor of the second network element, the first processor forwarding the state synchronization message to the specific traffic processor based on the transport layer address, wherein the specific traffic processor creates a second session object in response to receiving the state synchronization message, wherein the second session object tracks the communication session between the end user terminal and the information provider.

2. The method of claim 1, wherein the transport layer address of the state synchronization message comprises a UDP port number.

3. The method of claim 1, wherein the state synchronization message further includes a network layer address associated with the second network element.

4. The method of claim 1, further comprising: determining that the first network element has failed; and transitioning the second network element to the active mode.

5. The method of claim 4, wherein traffic associated with the communication session is routed through the specific traffic processor of the second network element in response to the transitioning of the second network element to the active mode.

6. A first network element comprising:
a first board; a first plurality of processors residing on the first board; a first traffic processor of the first plurality of processors configured to:
create a first session object associated with a communication session between an end user terminal and an information provider, the first network element operating in an active mode, wherein the first network element and a second network element present a single network layer address to the end user terminal and the information provider;
a portion of traffic associated with the communication session between the end user terminal and the information provider being routed through the first traffic processor of the first network element;
determine, at the first network element, a specific traffic processor of a second plurality of processors to which to send a state synchronization message associated with the first session object, the second plurality of processors residing on a second board of a second network element operating in a standby mode; associate a transport layer address corresponding to the specific traffic processor of the second network element with the state synchronization message; and
send the state synchronization message to a first processor of the second network element, the first processor forwarding the state synchronization message to the specific traffic processor based on the transport layer address, wherein the specific traffic processor creates a second session object in response to receiving the state synchronization message, wherein the second session object tracks the communication session between the end user terminal and the information provider.

7. The first network element of claim 6, wherein the transport layer address of the state synchronization message comprises a UDP port number.

8. The first network element of claim 6, wherein the state synchronization message further includes a network layer address associated with the second network element.

9. The first network element of claim 6, wherein the second network element is configured to transition to the active mode upon a determination that the first network element has failed.

10. The first network element of claim 9, wherein traffic associated with the communication session is routed through the specific traffic processor of the second network element in response to the transitioning of the second network element to the active mode.

11. A method comprising:
receiving a state synchronization message by a network processor of a first network element operating in a standby mode, the state synchronization message including a transport layer address corresponding to a specific traffic processor of a first plurality of traffic processors residing on a first board of the first network element,
the state synchronization message being received in response to a first traffic processor of a second plurality of processors residing on a second board of a second network element, operating in an active mode:
creating a first session object associated with a communication session between an end user terminal and an information provider;
associating the transport layer address corresponding to the specific traffic processor of the second network element with the state synchronization message; and
sending the state synchronization message to the specific traffic processor;
routing the state synchronization message to the specific traffic processor based upon the transport layer address; and
creating, with the specific traffic processor, a second session object in response to receiving the state synchronization message, the second session object tracking the communication session between the end user terminal and the information provider.

12. The method of claim 11, wherein the transport layer address of the state synchronization message comprises a UDP port number.

13. The method of claim 11, wherein the state synchronization message further includes a network layer address associated with the first network element.

14. The method of claim 11, further comprising: determining that the second network element has failed; and transitioning the first network element to the active mode.

15. The method of claim 14, wherein traffic associated with the communication session is routed through the specific traffic processor of the first network element in response to the transitioning of the first network element to the active mode.

16. A first network element comprising:
a specific traffic processor of a plurality of traffic processors residing on a first board of the first network element;
a network processor configured to:

receive a state synchronization message, the first network element operating in a standby mode, wherein:

the state synchronization message includes a transport layer address corresponding to a specific traffic processor of a plurality of traffic processors residing on a first board of the first network element, the state synchronization message is received in response to a second traffic processor of a second plurality of processors residing on a second board of a second network element operating in an active mode:

creating a first session object associated with a communication session between an end user terminal and an information provider;

wherein a portion of the traffic associated with the communication session is routed through the second traffic processor of the second network element;

associating the transport layer address corresponding to the specific traffic processor of the first network element with the state synchronization message; and sending the state synchronization message associated with the first session object to the specific traffic processor;

route the state synchronization message to the specific traffic processor based upon the transport layer address; and wherein the specific traffic processor is configured to:

create a second session object in response to receiving the state synchronization message, the second session object tracking the communication session between the end user terminal and the information provider.

17. The first network element of claim 16, wherein the transport layer address of the state synchronization message comprises a UDP port number.

18. The first network element of claim 16, wherein the state synchronization message further includes a network layer address associated with the first network element.

19. The first network element of claim 11, wherein the first network element is configured to:

transition the first network element to the active mode upon a determination that the second network element has failed.

20. The first network element of claim 19, wherein traffic associated with the communication session is routed through the specific traffic processor of the first network element in response to the transitioning of the first network element to the active mode.

21. The method of claim 1, further comprising:

creating a third session object by a second traffic processor residing on the first board of the first network element operating in the active mode;

determining, at the first network element, to send a second state synchronization message associated with the third session object to a second specific traffic processor residing on the second board of the second network element;

associating a second transport layer address corresponding to the second specific traffic processor of the second network element with the second state synchronization message;

sending the second state synchronization message to the second specific traffic processor, the second specific traffic processor creating a fourth session object in response to receiving the second state synchronization message.

22. The first network element of claim 6, further comprising a second traffic processor residing on the first board configured to:

create a third session object while the first network element is operating in the active mode;

determine a second specific traffic processor residing on the second board of the second network element to which to send a second state synchronization message associated with the third session object;

associate a second transport layer address corresponding to the second specific traffic processor with the second state synchronization message;

send the second state synchronization message to the second specific traffic processor, the second specific traffic processor creating a fourth session object in response to receiving the second state synchronization message.

23. The method of claim 11, further comprising: receiving a second state synchronization message by a second specific traffic processor residing on the first board of the first network element, the second state synchronization message including a second transport layer address corresponding to the second specific traffic processor, the second state synchronization message being received in response to a second traffic processor residing on the second board of the second network element:

creating a third session object while the first network element is operating in the active mode;

determining to send the second state synchronization message to the second specific traffic processor;

associating the second transport layer address corresponding to the second specific traffic processor with the second state synchronization message; and sending the second state synchronization message to the second specific traffic processor; and creating a fourth session object by the second specific traffic processor in response to receiving the second state synchronization message.

24. The first network element of claim 16, further comprising:

a second specific traffic processor residing on the first board configured to:

receive a second state synchronization message, the second state synchronization message including a second transport layer address corresponding to the second specific traffic processor, the second state synchronization message being received in response to a second traffic processor residing on the second board of the second network element:

creating a third session object while the second network element is operating in the active mode;

determining to send the second state synchronization message to the second specific traffic processor;

associating the second transport layer address corresponding to the second specific traffic processor with the second state synchronization message; and sending the second state synchronization message to the second specific traffic processor; and create a fourth session object by the second specific traffic processor in response to receiving the second state synchronization message.

* * * * *